Feb. 12, 1935.  H. LIBBERTON  1,990,554
METHOD OF AND MEANS FOR MAKING INSULATING SLABS
Filed Feb. 19, 1930   8 Sheets-Sheet 1
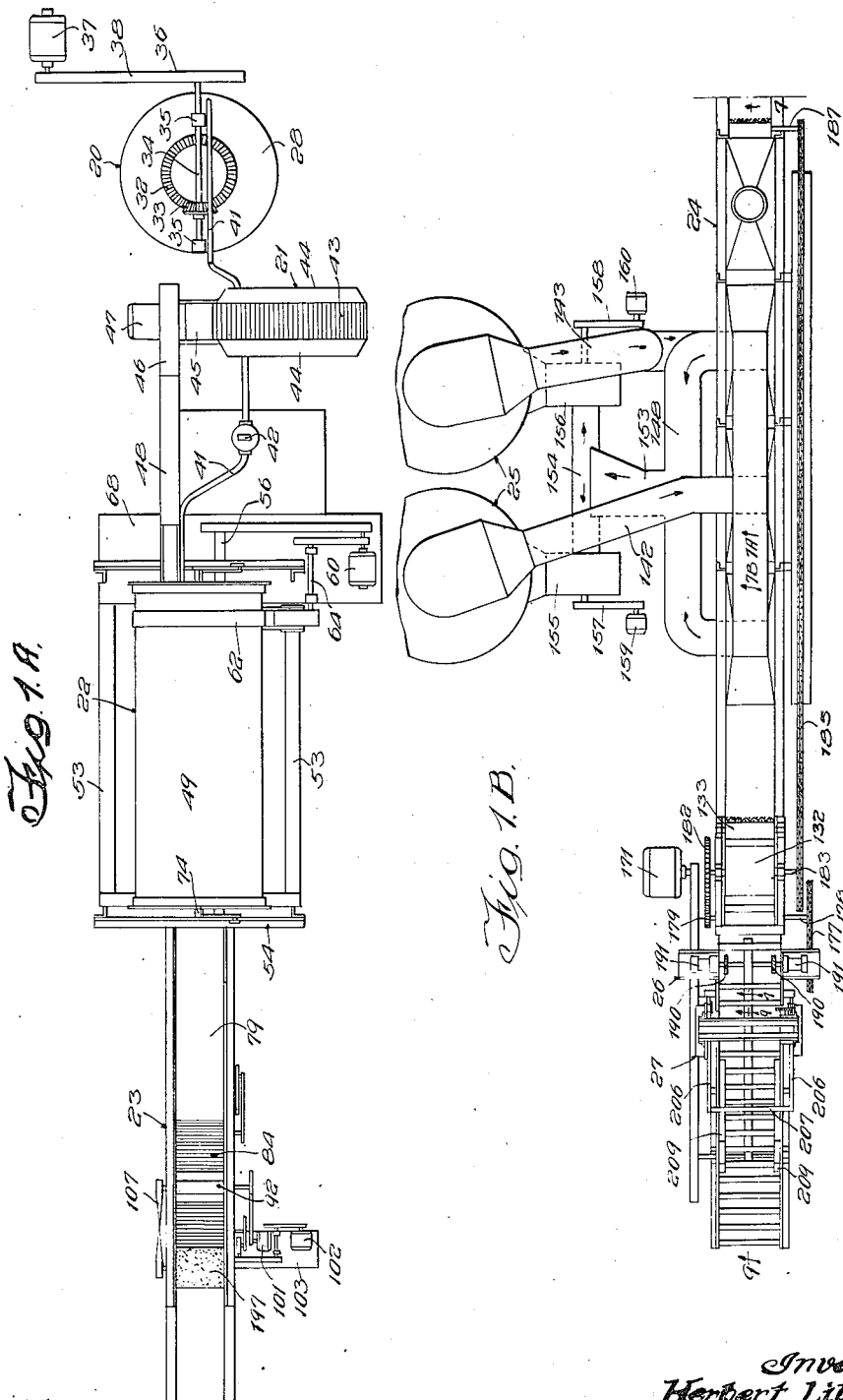
Witness:
William P. Kilroy
Inventor:
Herbert Libberton Feb. 12, 1935.  H. LIBBERTON  1,990,554
METHOD OF AND MEANS FOR MAKING INSULATING SLABS
Filed Feb. 19, 1930  8 Sheets-Sheet 2
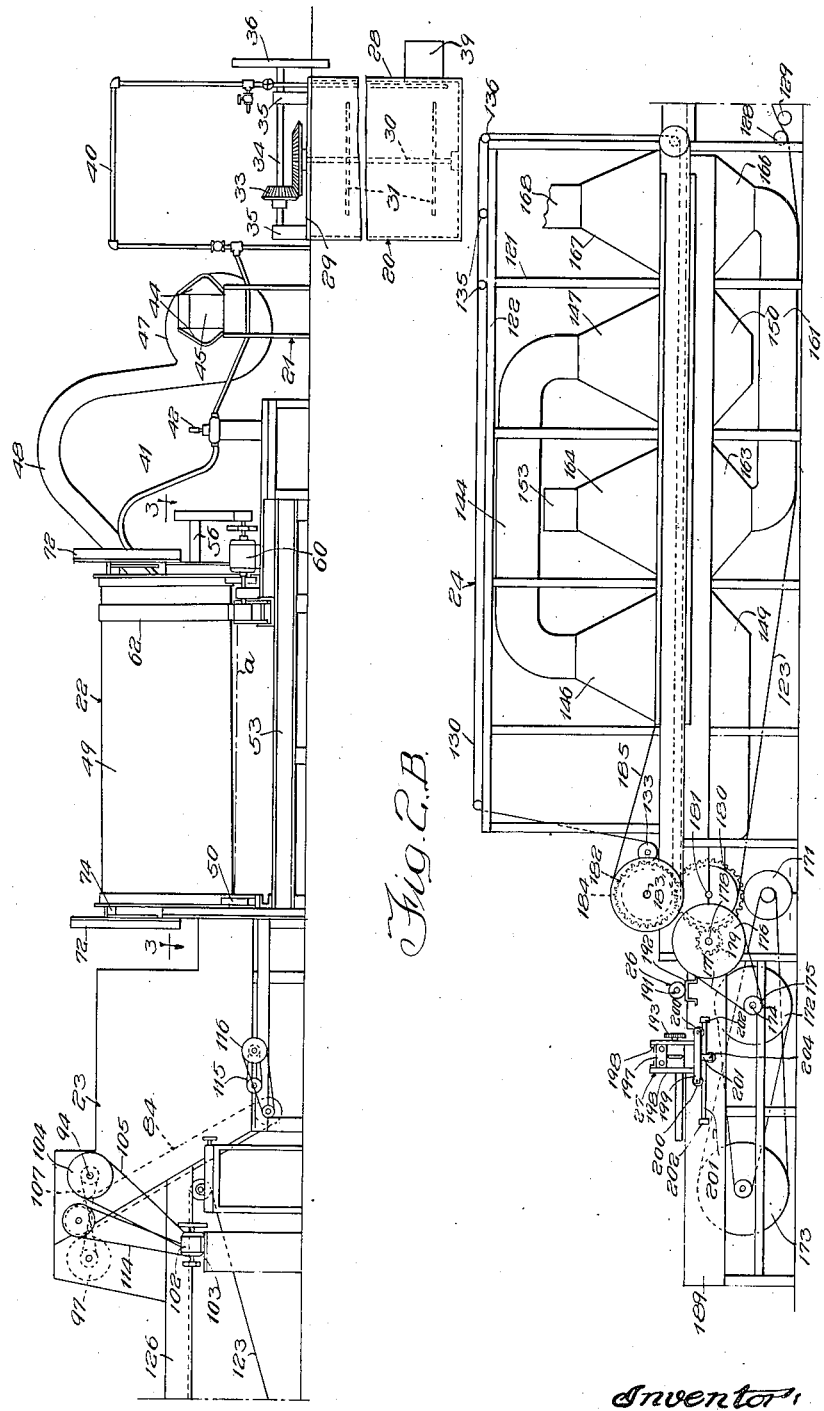
Witness:
William P. Kilroy
Inventor:
Herbert Libberton
By Brown, Jackson, Boettcher · Dienner
Attys

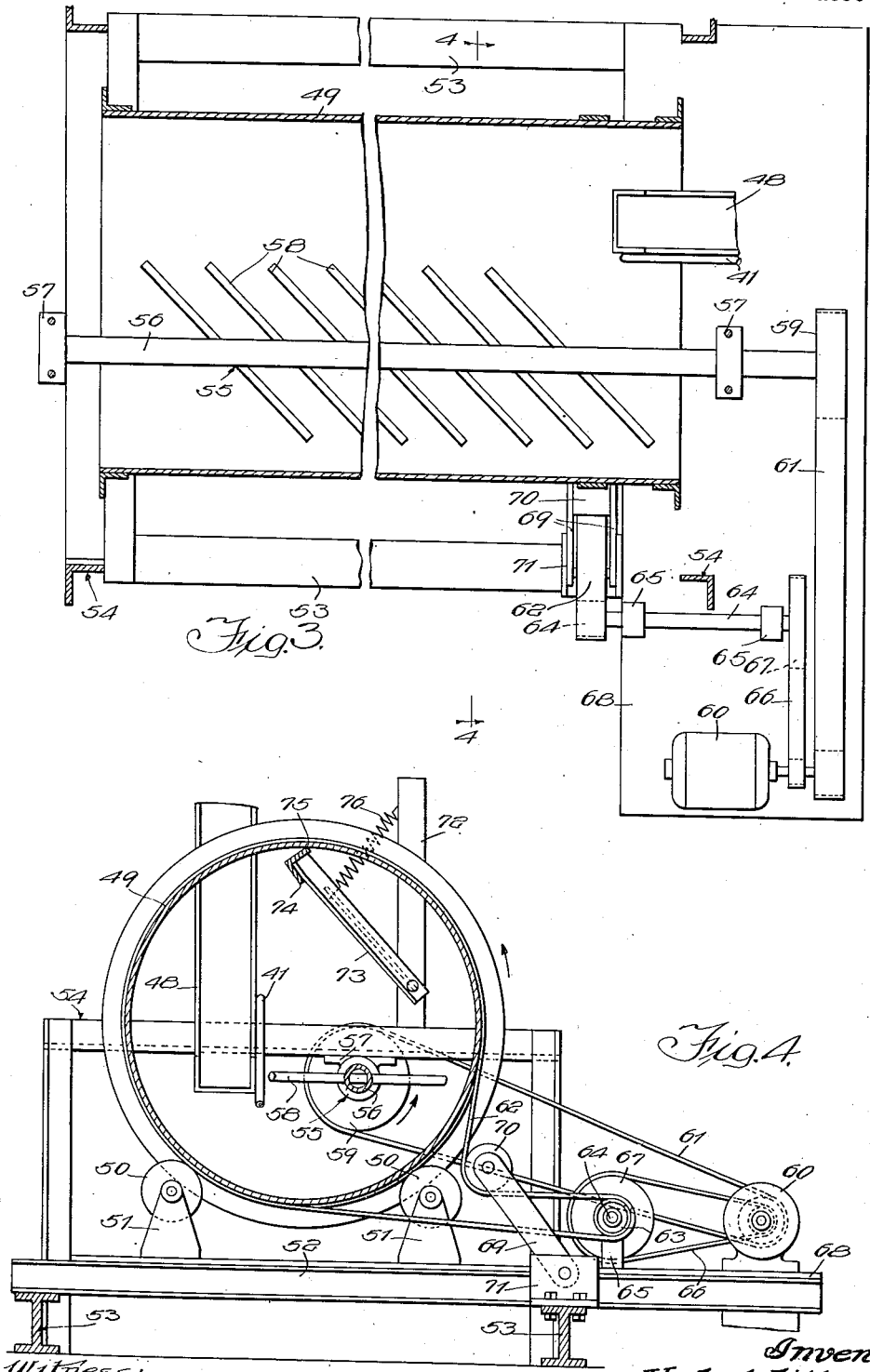

Feb. 12, 1935.    H. LIBBERTON    1,990,554
METHOD OF AND MEANS FOR MAKING INSULATING SLABS
Filed Feb. 19, 1930    8 Sheets-Sheet 4
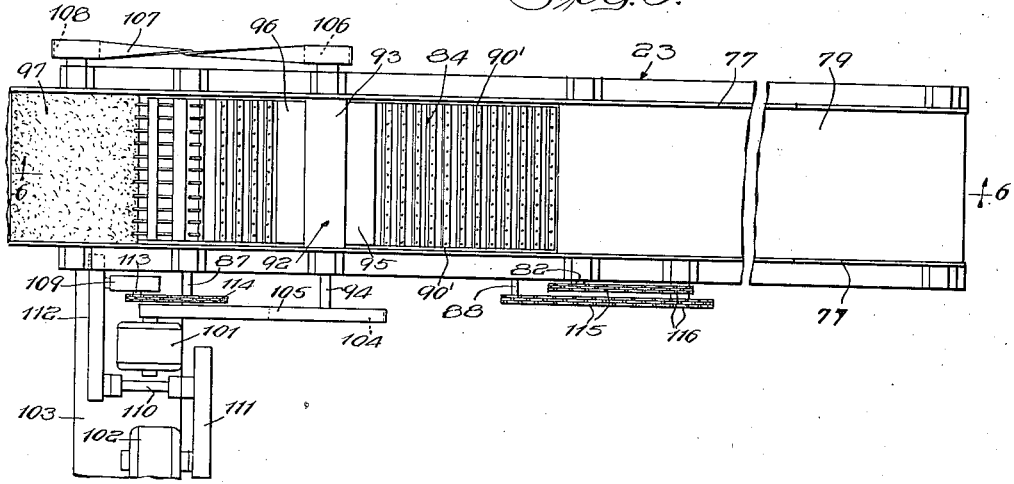
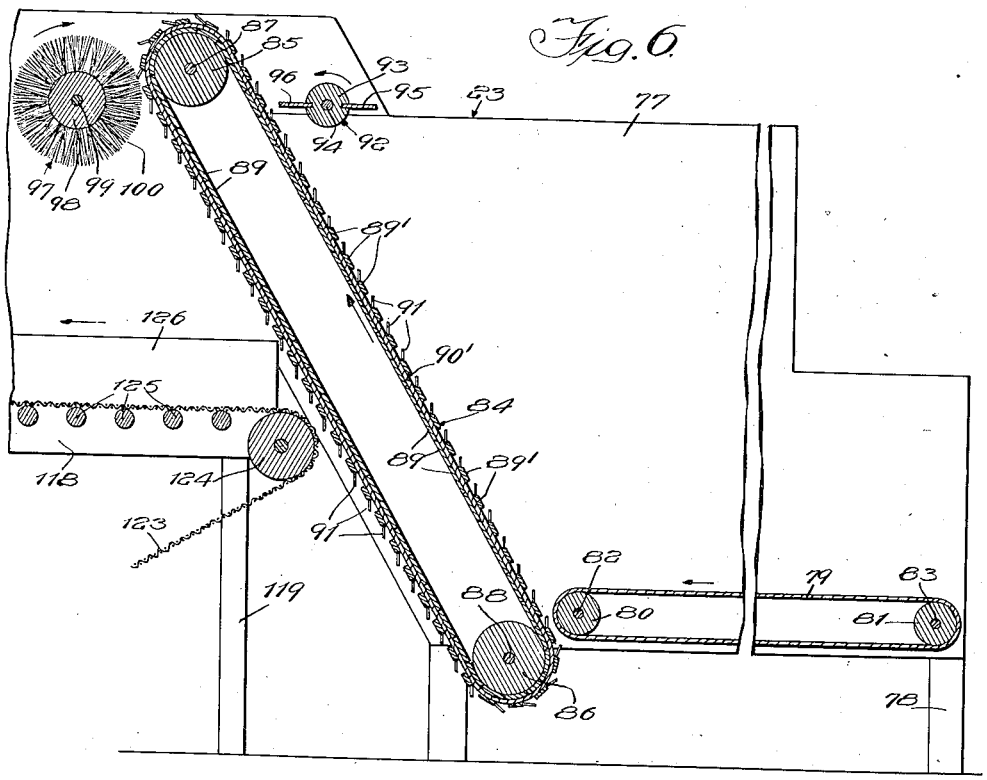
Witness:
William P. Kilroy
Inventor:
Herbert Libberton Feb. 12, 1935.  H. LIBBERTON  1,990,554
METHOD OF AND MEANS FOR MAKING INSULATING SLABS
Filed Feb. 19, 1930   8 Sheets-Sheet 5
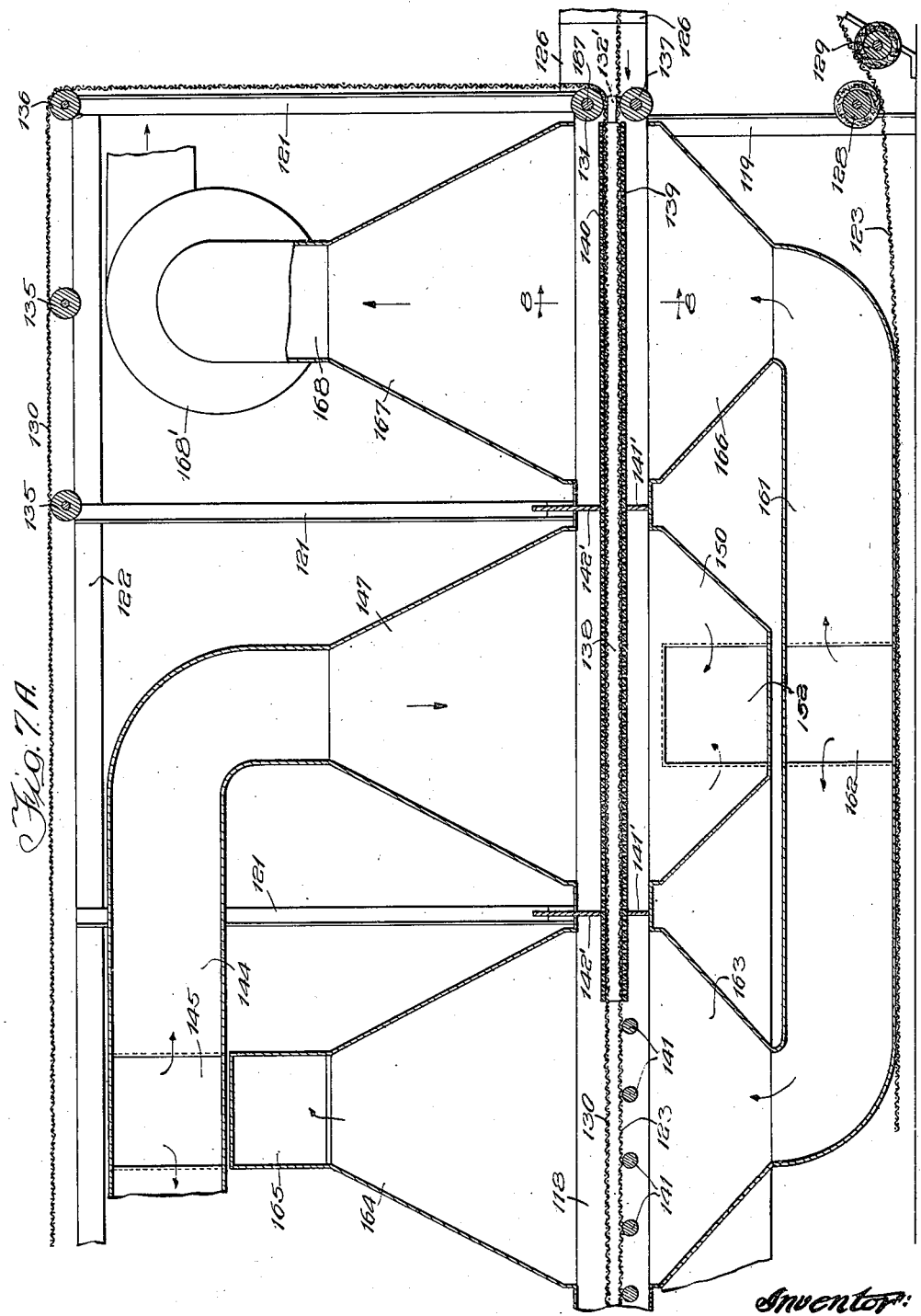

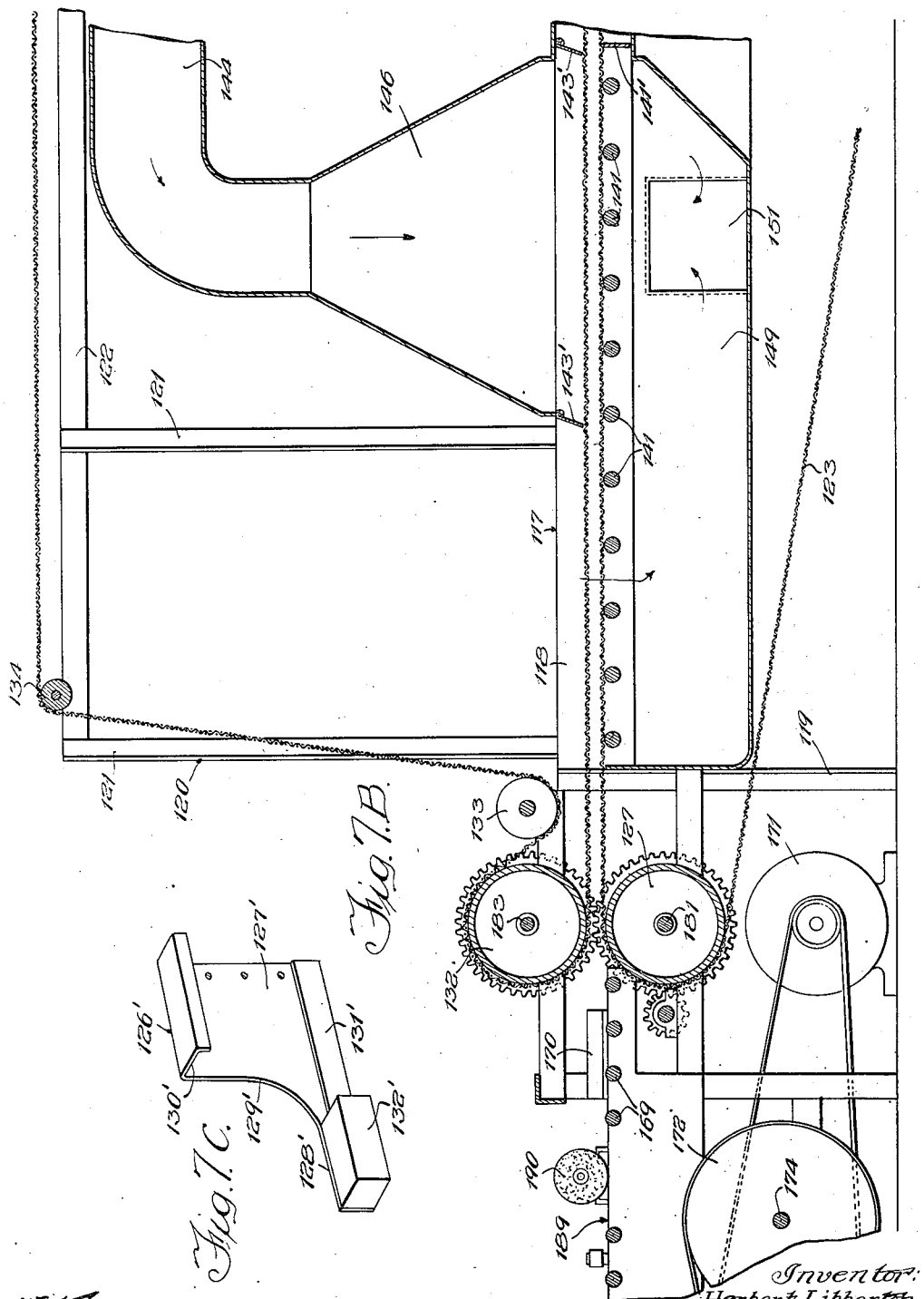

Feb. 12, 1935. H. LIBBERTON 1,990,554
METHOD OF AND MEANS FOR MAKING INSULATING SLABS
Filed Feb. 19, 1930 8 Sheets-Sheet 7

Inventor:
Herbert Libberton

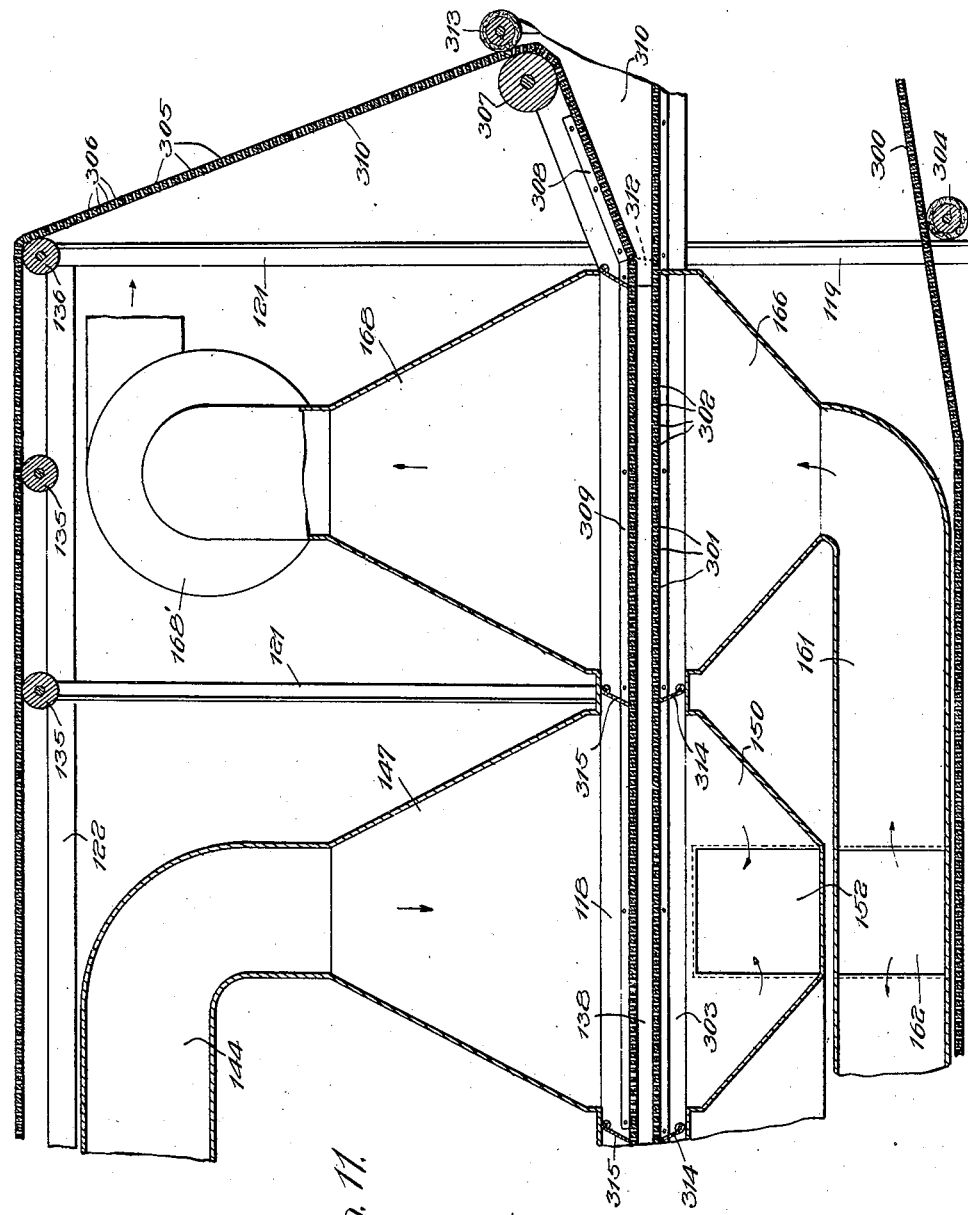

Patented Feb. 12, 1935

1,990,554

UNITED STATES PATENT OFFICE 1,990,554

METHOD OF AND MEANS FOR MAKING INSULATING SLABS

Herbert Libberton, Chicago, Ill., assignor to The Soundex Corporation, Chicago, Ill., a corporation of Illinois Application February 19, 1930, Serial No. 429,587

7 Claims. (Cl. 34—12)

This invention relates to the manufacture of light weight building material and is more particularly directed to a method of and means for making heat insulating and sound absorptive slabs.

More specifically, this invention relates to the manufacture, by continuous process, of a building material having the qualities of the light weight fibrous building materials now known and which, in addition to being inexpensive to manufacture, is permanent, water resistant, fire resistant, and heat and sound insulating and composed of vegetable fibers, such as excelsior, wood wool, or the like, intertwined, and bonded together by a suitable cementitious binder or adhesive such, for example, as sodium silicate mixed with calcium carbonate. For a more specific description of the physical make-up and character of the finished product, reference may be had to the copending application of Cass L. Kennicott and myself, Serial No. 313,402, filed October 19, 1928, for Mold and slab machine.

With the above in view, it is an object of this invention to provide a novel process, method of and apparatus for the manufacture of heat and sound insulating slabs of building material having the above outlined characteristics. Generally, the process comprises mixing the cementitious binder, cutting up or mincing vegetable fibers to a proper length, conveying both the binder and the fibers to a coater, coating the fibers with the cementitious binder, feeding the coated fibers in a uniform loose mass to a combined compressor and setting accelerator, compressing and setting the loose mass of coated fibers whereby the mass assumes the form of a continuous sheet, finishing the edges of the continuous sheet, and cutting the sheet into slabs of any desired length.

The materials used in the manufacture of the heat and sound insulating slabs, are vegetable fibers such, for example, as excelsior or wood wool, sodium silicate, calcium carbonate, and water. For heat insulating slabs ordinary fine excelsior is employed, while superfine wood wool, preferably made from bass wood, is used in the manufacture of sound insulating slabs, both forms of fibers being as free from chips as possible. The cementitious binder, preferably employed, comprises one part of high ratio sodium silicate (1: 3.45), Beaumé 41°, by weight; 1½ parts, by weight, of limestone preferably in the form of whiting or finely ground limestone, 95 per cent of which should preferably pass through a 300 mesh sieve, although this may vary slightly; and 50 per cent by weight of water.

The percentage of water is calculated on the weight of the silicate of soda. I have found that the percentage of water employed need not be fixed, but may be varied from 20 per cent up to 60 per cent. So far as I have been able to determine, there is no difference in the water resistance of the various consistencies, but it will be apparent that the thinner material lends itself to a more ready coating of the vegetable fibers than the thicker.

In order that the fiber coating step may be continuously carried on, it will be apparent that the first two steps, namely the mixing of the cementitious binder and the chopping up of the vegetable fibers, be concurrent.

Mixing of the cementitious binder is accomplished in a tank provided with an agitator comprising paddles attached to a vertical shaft revolving slowly. The silicate of soda is first run into the tank, the limestone then added, and finally the water. The mixing operation is practically complete as soon as all the ingredients are in place in the mixing tank. The prepared binder is then delivered to the coater through a feeder pipe by means of a centrifugal pump.

Concurrently with the mixing of the cementitious binder, vegetable fibers such as excelsior or wood wool, as desired, are cut up in a chopping apparatus of the character of a silage cutter and also delivered to the coater by means of a fan and an appropriate conveying chute.

The coating step is carried on in a large drum having a smooth inner periphery into which the vegetable fibers and the binder are concurrently discharged as above outlined. Here the fibers are thoroughly coated with the binder by being received upon a rapidly rotating agitator which whips and delivers, by centrifugal force, both fibers and binder to the inner periphery of the drum. The fibers and binder are carried around by the cylinder for a portion of the rotation thereof, are removed from the inner periphery and upon removal deposited back upon the agitator whereby they are again whipped and delivered by centrifugal force to the inner periphery of the drum. This cycle of operation in coating is carried on continually from one end of the drum to the other so that as the fibers and binder are progressively moved from the receiving end of the drum to the discharge end, the fibers and binder have come in contact with each other a sufficient number of times to thoroughly coat each fiber with the binder.

The coater discharges the coated fibers into a feeder generally comprising a horizontal belt conveyor and an elevator conveyor provided with outwardly extending projections or spikes which are adapted to spear the coated fibers and thereby carry the fibers to the discharge end thereof. Inasmuch as the projections of the elevator conveyor do not always pick up a uniform load, the excess of fibers accumulated by the projections is stripped off and returned to the hopper of the feeder.

By maintaining a uniform load upon the elevator conveyor, a uniform amount of fibers is discharged thereby at the discharge end thereof.

The feeder elevator conveyor is adapted to discharge its load in a loose mass upon a slowly moving conveyor upon which the loose mass of fibers is adapted to be compressed and set, the mass being carried thereby through a setting accelerator in which the binder is rapidly set by means of the passage of preheated air therethrough. The compression of the coated fibers is accomplished between two rolls in juxtaposition one above the other, the supporting conveyor passing over the lower roll while a companion belt passes around and under the upper roll in spaced relation, the belts at this point being spaced apart to compress the mass to the desired ultimate thickness. These belts move in parallel relation substantially the length of the setting accelerator. By way of example, the loose mass of fibers may be compressed by this means from a thickness of about seven inches to a thickness of slightly more than an inch. This may, of course, be varied to suit the demand. Inasmuch as the cementitious binder employed is not flexible while setting, the compressed mass must be held rigid while passing through the setting period. Any movement of the fibers relative to one another during the setting process would break up the bond so that the finished product would not have the desired strength. Consequently, during the first portion of the passage of the compressed mass through the setting accelerator, the upper and lower belts are held in fixed spaced relation by perforated steel plates, which although permitting of comparatively free passage of air therethrough, nevertheless hold the fibrous mass firmly in place without any relative separation or movement of the fibers.

In order to permit of variation of the thickness of the resultant material, the upper plate is made adjustable vertically so that the space between the belts may be varied. It has been found in practice that a maximum temperature of 300° is sufficient for purposes of accelerating the setting of the binder. The passage of the compressed mass through the setting accelerator may be at the rate of from two to six feet per minute so that with the setting of the binder taking place rapidly, the moving mass need only be held in compressed condition for a portion of movement through the setting accelerator, the remainder of the passage of the mass through the accelerator being free from compression inasmuch as the mass quickly takes on sufficient stiffness or rigidity to support itself. Thus by the time that the mass has passed through a greater portion of the accelerator, it has assumed the form of a continuous sheet.

As the continuous sheet leaves the accelerator, the edges thereof are finished to remove roughness and unevenness therefrom. The sheet is then cut into slabs of a desired length by means of a rotary saw moving at right angles to the sheet and concurrently moving along the line of travel of the sheet so as to insure a right angle edge.

In carrying out the above briefly outlined steps of the process and method, I have provided certain novel apparatus.

One of these features of novelty resides in the construction and operation of the coater. As stated above, the cementitious binder and chopped up or minced vegetable fibers are introduced into a means for coating the fibers with the binder.

This means comprises a rotating, open-ended, cylindrical drum having a smooth inner periphery. A rapidly rotating agitator comprising a rod extending through the cylinder in parallel relation to the axis thereof but eccentrically disposed with respect thereto and provided with angularly disposed arms for purposes of preventing accumulation of the fibers adjacent the rod and consequent wrapping of these fibers around the rod, is adapted to receive the fibers and binder upon introduction thereof into the receiving end of the cylinder. Due to the relatively rapid rotation of the agitator, the fibers and binder are whipped and directed by centrifugal force to the inner periphery of the drum. The drum carries the fibers and binder around for a portion of the rotation thereof whence they are removed by a scraper and deposited again upon the agitator and again impelled thereby against the inner periphery of the drum. In order to impart progressive movement to the freshly received fibers and binder, and binder coated fibers within the cylinder, the latter is mounted for rotation about an axis sloping downwardly from the receiving end to the discharge end. The alternating movement of the fibers and binder form agitator to the inner periphery of the cylinder and back again in continuous cycles provides the fibers with a thorough coating of binder. This action also tends to segregate the individual fibers so that there is no "lumping" of the fibers and at the same time the fibers are discharged in haphazard and inter-twined form at the discharge end of the coater.

Another important feature of the apparatus employed is the structure and operation of the feeder receiving coated fibers at the discharge end of the coater, and conveying and depositing these fibers in a uniform mass upon the lower conveyor of the setting accelerator. This portion of the apparatus comprises a horizontally disposed endless belt positioned at the bottom of a hopper to which the fibers discharged from the coater are delivered. The discharge end of this belt is disposed proximately to the receiving end of an upwardly inclined elevator conveyor comprising an endless belt of transversely disposed metal slats carrying wooden slats thereon and carried at their ends by two chains. Each slat carries sharpened projections or spikes pointed vertically and, therefore, angularly disposed to the slats in the direction of travel of the conveyor. To prevent the passage of fine particles of the fibers from gaining access to the cracks between adjacent metal slats, a continuous fabric belt is interposed between the metal and wooden slats. Since the material delivered by the horizontal belt to the elevator conveyor comprises a wet and sticky loose mass, the projections or spikes upon the elevator conveyor do not always pick up a uniform load. To provide for an even and uniform distribution of the material upon this elevator conveyor, a stripper comprising two diametrically opposed radially extending strips of leather or other suitable material mounted on a transversely extending rod revolving at high speed and clearing the outer ends of the projections by any desired clearance is adapted to strip off excess material and throw it back into the hopper. Furthermore, due to the wet and sticky character of the material carried by the elevator conveyor, the projections must be brushed free of all binder to prevent clogging up of the slats of the feeder.

To this end a revolving wire brush is provided at the discharge end of the elevator conveyor so that as the slats with their load of coated fibers come up over the top and begin to descend, the brush wipes the fibers clear from the projections and impels the fibers downwardly onto the moving belt carrying the fibers into the compressor and setting accelerator. At the time of contact of the projections by the wire revolving brush, the projections are pointing vertically downwardly so that the coated fibers are freely and quickly removed therefrom. Due to the uniform load distribution of the coated fibers upon the elevator conveyor, the fibers discharged by the conveyor are deposited upon the belt carrying the material into the compressor and setting accelerator in a uniform loose mass.

A further feature of importance in the apparatus employed resides in the novel construction and operation of the compressor and setting accelerator. The horizontally disposed belt receiving the uniform loose mass of coated fibers from the feeder comprises an endless belt of reticulated construction. This belt is adapted to carry the coated fibers forwardly at a rate of from two to six feet per minute. Cooperating with this lower belt, is an upper belt of reticulated construction moving at the same rate as the lower belt and passing over a roller disposed in the spaced relation above the lower belt a distance equal to the desired thickness of the completed slabs. A roller is also provided for the lower belt in opposed relation to the above noted upper belt roller so as to provide suitable backing for the belts at the point of initial compression of the moving mass.

As the loose mass of coated fibers is carried into the compressor and setting accelerator by the lower belt when the upper belt comes into contact with the upper surface thereof, the mass is compressed to the desired thickness. Inasmuch as the compression is applied vertically downwardly, there is a tendency on the part of the compressed mass to run out at the edges of the belts. It will be further noted that reticulated mesh belts do not have smooth, well finished edges. This is particularly true of those formed of cold drawn steel wire twisted into spirals and each spiral twisted into the adjacent one, which have been found to be best suited for the purpose inasmuch as they prevent warping while permitting free passage of air therethrough. In order to prevent running out of the material at the edges of the belts and at the same time to provide the continuous moving mass with smooth, regular edges, side guides extending longitudinally of the belts and therebetween and mounted inwardly of the edges of the belts are provided. Mold sections at the receiving end of the lower conveyor fitting the belt curve accurately, extend part way into the compressor and setting accelerator and match perfectly with the inside rails or guides above mentioned. Since the cementitious binder employed is not flexible while setting, it is important that the material be held rigid while passing through the setting period. Should relative movement of the fibers take place during the setting period, the bond would be broken so that the finished product would have little or no strength.

To provide for such rigidity, the upper and lower belts are held in firm, definite, spaced relationship from each other by perforated steel plates of nonbuckling alloy steel which, although allowing for comparatively free passage of air therethrough, nevertheless holds the fibrous compressed mass firmly in place without any relative movement of the fibers. The upper plate is movable up and down in like manner as is the upper belt so as to permit of the production of slabs of varying thickness. The lower plate is fixed and stationary.

Heat for the setting and drying operation is supplied by hot air furnaces which are adapted to supply preheated air to the compressor and setting accelerator at a temperature of about 300° maximum which has been found to be sufficient for all ordinary purposes. Five passes of air are employed in the compressor and setting accelerator, the first pass being one at maximum temperature while the last of these passes is a cooling pass through the material itself. These five passes of air are taken through the moving mass in alternate, opposite directions whereby the setting of the cementitious binder is accomplished with maximum efficiency. It will be, of course, apparent that any other gases might be employed in place of air, if desired.

After the moving material passes beyond the range of the perforated plates, it has taken on sufficient stiffness to support itself, so that the lower belt is only carried on rollers from that point on. On delivery, the material has assumed the shape of a continuous sheet and as an extra precaution for centering, the continuous sheet first passes through two side guides.

Another feature of importance is the provision of a modified form of compressor and setting accelerator for forming a continuous sheet of fibrous material. This is accomplished by the provision of endless belts of perforated plates for carrying a mass of binder coated fibers under pressure through passes of gases or air. In this case, the lower conveyor comprises an endless belt of transversely extending slats or plates provided with perforations therein carried at their ends by endless chains in substantially the same manner as the reticulated conveyor of the compressor and setting accelerator heretofore described, except that in place of being supported on rollers for a portion of its movement through the apparatus, the conveyor in the present instance is supported on suitable tracks. The upper conveyor likewise comprises an endless belt of perforated plates and is carried in substantially the same manner as the upper conveyor of the preceding compressor and setting accelerator, with the exception that instead of suddenly converging around a roller to cooperate with the lower conveyor, the convergence is gradual. In order to impose pressure upon the mass carried by the lower conveyor, the upper conveyor is adapted to pass under tracks, the tracks being mounted for vertical movement to permit adjustment of the upper conveyor relative to the lower one to vary the thickness of the continuous sheet of material. The plates are preferably formed of nonbuckling alloy steel, perforated to permit of passage of gases or air therethrough. Thus as the mass moves through the various passes of preheated gas or air, such gas or air may pass freely through the perforations in the plates and through the mass. While the perforations in the plates and interstitial spaces between the plates may permit the formation of surface protuberances, they will be very small and of no material consequence due to the length of the fibers employed. The resultant slabs may be smoothed by the application of suitable abrasives if smooth slabs are desired, or the faces of the slabs may be left unfinished. In the latter case, the surface protuberances will permit of better bonding thereto of finishing substances such as plaster, stucco or the like. As in the case of the modified form of compressor and setting accelerator heretofore described, the moving mass of binder coated fibers is maintained under compression only for the first portion of its passage through the apparatus, for after passing through several passes of preheated gases or air, the binder of the mass is sufficiently set to give the mass sufficient rigidity for its passage through the final passes of preheated gases or air and the cooling pass in the form of a continuous sheet. To permit of adjustability for various thicknesses of slabs, the tracks for the upper belt are adjustable. Interchangeable side guides are also adapted to be positioned between the upper and lower belts inwardly of their edges to maintain the desired width of the mass and to prevent running out of the compressed mass at the receiving end of the mechanism.

Upon leaving the compressor and setting accelerator, the sheet passes between two edger wheels which are set to finish the edges of the continuous sheet to the desired width.

The continuous sheet is then cut into slabs of the desired lengths by a rotary cut-off saw moving on guides at right angles to the longitudinal axis of the sheet and carried by a frame which moves along with the sheet at the same speed, thus insuring a right angle cut.

Further features of the invention, objects and advantages thereof will be apparent from the following detailed description of a preferred embodiment of the invention illustrated in the accompanying drawings in which:

Figures 1A and 1B when placed end to end with Figure 1B at the left of Figure 1A, constitute a plan view of the entire apparatus.

Figures 2A and 2B are side elevations of the apparatus and correspond respectively to Figures 1A and 1B;

Figure 3 is a fragmentary section of the coater taken along the line 3—3 of Figure 2A;

Figure 4 is a vertical section of the coater taken along the line 4—4 of Figure 3.

Figure 5 is a plan view of the feeder;

Figure 6 is a section taken along the line 6—6 of Figure 5 showing parts of the mechanism in elevation;

Figure 8:
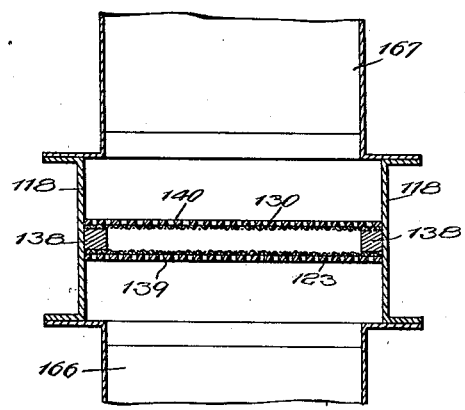
Figure 9:
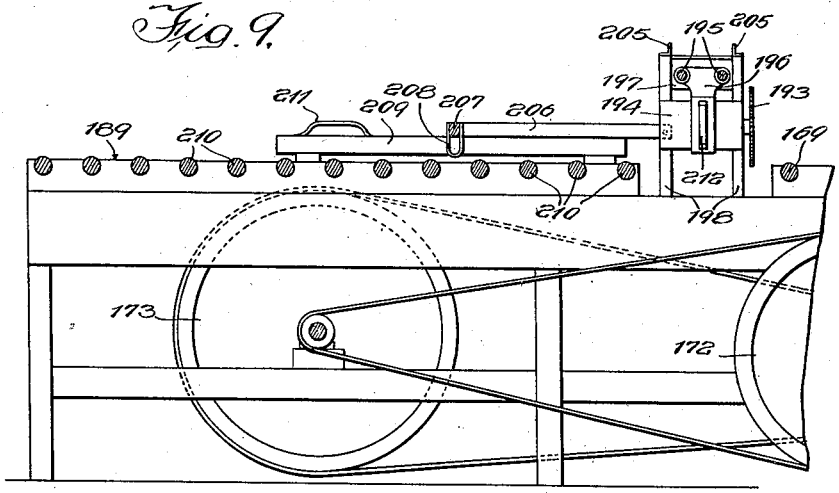
Figure 10:
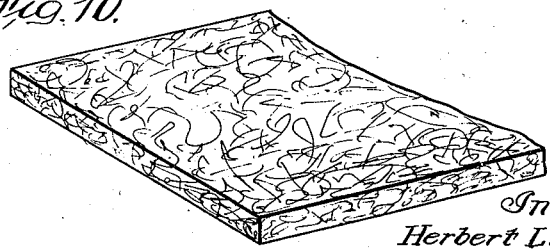

Figures 7A and 7B constitute a vertical section of the compressor and setting accelerator taken along the lines 7A—7 and 7—7B of Figure 1B respectively;

Figure 7C is a perspective view of an interchangeable guide plate employed at the receiving end of the combined compressor and setting accelerator;

Figure 8 is a fragmentary section taken along the line 8—8 of Figure 7A;

Figure 9 is a vertical section of the final discharge end of the apparatus showing the slab cutter;

Figure 10 is a perspective view of a fragmentary portion of the finished slab; and Figure 11 is a section of a modified form of compressor and setting accelerator, the section corresponding to that illustrated in Figure 7A.

In order to simplify the disclosure and to more readily acquaint those skilled in the art with the various steps of the continuous process involved in the present invention, I shall first describe the apparatus employed.

Generally, reference being had particularly to Figures 1A, 1B, 2A, and 2B, the apparatus comprises a mixer 20, a vegetable fiber chopper 21 and coater 22, a feeder 23, combined compressor and setting accelerator 24, furnaces 25 for supplying preheated air for the compressor and setting accelerator 24, edger 26, and slab cutter 27.

The mixer 20 comprises a cylindrical tank 28, the body portion of which is preferably mounted in counter-sunk relation to the floor upon which the balance of the apparatus rests, with only the top or head 29 thereof projecting above the surface of such floor. An axially disposed vertical shaft 30 carries thereon radially extending horizontally disposed arms 31 constituting an agitator. Above the head 29 of the tank 28, shaft 30 is provided with a beveled gear 32 adapted to rotate in a horizontal plane and to be driven by a beveled pinion 33 meshed therewith and mounted upon a horizontally extending shaft 34 supported in upwardly extending bearing supports 35. The outer end of shaft 34 extends beyond the outer bearing support 35 and has mounted thereon and fixed thereto a pulley 36 driven from a motor 37 by means of a belt 38. The gear reduction between the pinion 33 and gear 32 is such that the agitator is rotated very slowly.

The cementitious binder employed is made up of the ingredients and in the proportions hereinbefore noted. The silicate of soda is first run into the tank, the limestone then added and finally the water. The mixing operation is practically complete as soon as all the ingredients have been run into the tank.

Delivery of the cementitious binder is accomplished by means of a centrifugal pump 39 having its exhaust port connected with a pipe line 40 having a suitable pipe connection 41 leading into the receiving end of the coater 22.

Measuring of the binder is accomplished with a meter 42 provided with indicating means whereby the amount of material being discharged into the coater per unit of time is indicated and also indicating the total amount of binder passed therethrough. Inasmuch as only a sufficient amount of binder is employed for merely the coating of the vegetable fibers I have found a meter provided with a pointer indicating two gallons at one revolution and an integrating dial to show the total to be quite practical.

Fiber cutter 21 is preferably positioned between the mixer 20 and the coater 22, and is of the nature of a well-known silage cutter comprising generally a horizontal conveyor 43 mounted for horizontal movement between two side guiding portions 44 and adapted to convey vegetable fibers such, for example, as excelsior or wood wool to a rotary cutter 45. As stated above, for heat insulating slabs, ordinary fine excelsior is employed while for sound insulating slabs super-fine wood wool preferably made from basswood and as free as possible from chips is employed.

A fan 46 suitably operated by a motor 47 impels the fibers which have been cut to a length varying from 6 to 8 inches through a conveying chute 48 to the receiving end of the coater 22.

Referring particularly to Figures 3 and 4, the coater comprises a horizontally disposed cylinder 49 having a smooth inner periphery, mounted for rotation about a horizontal axis upon four carrying or supporting rollers 50 mounted in pairs at each end of the cylinder upon journal supports 51 in turn supported upon a frame work comprising transversely extending beams 52 supported upon parallel longitudinally extending I-beams 53 resting upon the floor. A frame 54 of U-shaped formation is positioned with the ends of the legs thereof abutting the floor and secured to the I-beams 53, with the intermediate portions thereof extending across and adjacent the ends of the cylinder 49. An agitator 55 comprising a hollow rod or tube 56 is journaled in brackets 57 mounted upon the undersides of the intermediate portions of the frame 54. The tube 56 is mounted in parallel relation with the longitudinal axis of the cylinder 49 and to one side and below such axis so that the agitator is eccentrically disposed with reference to the cylinder 49. A series of rods 58 extending through the tube 56 in angular relation thereto and being disposed in angular relation to a transverse plane of the cylinder 49, complete the agitator 55. One end of the tube 56 extends beyond the receiving end of the coater 22 and is provided with a pulley 59 driven by a motor 60 suitably connected to the pulley 59 by means of a belt 61.

Cylinder 49 is rotated by a belt 62 passing over the outer periphery thereof and over a pulley 63 mounted upon a countershaft 64 journaled in two brackets 65, driven from motor 60 by means of a belt 66 passing over a pulley 67 on said countershaft. Motor 60 and brackets 65 are mounted upon a base plate 68 carried by beams 52. A pair of arms 69 carrying an idler pulley 70 between their free ends are pivoted to a support 71 secured to the inner I-beam 53. The cylinder belt 62 passes under the idler pulley 70 and the weight of the latter acts to take up any slack in belt 62. The horizontally disposed intermediate portion of each frame 54 has fixed thereto a vertical upwardly extending supporting standard 72 disposed to one side of the longitudinal axis of the cylinder 49. Adjacent the lower ends of each of the standards 72, an arm 73 is pivotally connected thereto, the free ends of these arms 73 carrying suitably connected thereto an angle iron scraper 74 so positioned that one edge 75 thereof has line contact with the inner periphery of the cylinder 49 at the uppermost portion thereof. A coil spring 76 is suitably connected with each of arms 73 adjacent the free ends of said arms with the other end of the spring 76 suitably secured to the standard 72 adjacent the upper ends thereof. These springs 76 are adapted to maintain the scraper 74 in yielding contact with the inner periphery of the cylinder 49.

The exhaust end of the pipe 41 which conducts the cementitious binder to the coater 22 and the exhaust end of the chute 48 conducting the chopped-up fibers to the coater are suitably connected together and supported by the intermediate portion of frame 54 adjacent the receiving end of cylinder 49 with the exhaust end of the pipe 41 and that of the chute 48 being so positioned as to discharge their contents into the cylinder 49 slightly inwardly of the receiving end of said cylinder so that the exhausted contents drop to the lower portion of the inner periphery of the cylinder.

Cylinder 49 is so supported as to have its axis sloping slightly downwardly from its receiving end to its discharge end. This will be at once apparent from an inspection of Fig. 2A where line $a$ is drawn parallel to the surface upon which the mechanism is mounted and indicates precise horizontal.

In operation, the cylinder 49 is rotated slowly while the agitator 55 is rotated at a very rapid rate. As the fibers and cementitious binder are discharged by their respective conduits into the cylinder 49 the materials are dropped to the lower portion of the periphery of the inner periphery of the cylinder when they are carried around by the rotation of said cylinder. Such portions of the materials as do not cling to the inner periphery of the drum or cylinder after passing the horizontal median thereof, will fall upon the rods 58 of the agitator 55 and will then be whipped and delivered to the inner periphery of the cylinder by the centrifugal force of the agitator. Such portions of the material as will adhere to the inner periphery of the cylinder and remain so, will be carried around by the cylinder until they are removed therefrom by the scraper 74 whence they will likewise drop upon the rods 58 of the agitator 55 and be whipped and delivered to the inner periphery of the cylinder.

This action continues in cycles and due to the slight downward sloping of the cylinder from the receiving end to the discharge end thereof, as each cycle of movement of the fibers and binders takes place, such fibers and binders will have moved slightly toward the discharge end of the cylinder. Thus as the coating operation continues, the fibers being coated are given a progressive movement from the receiving end of the cylinder to the discharge end thereof. It will be evident that the operation of the coater is such that during the course of the coating operation the fibers are thoroughly segregated and separated from one another and likewise thoroughly coated by the cementitious binder by reason of the thorough whipping they receive from the agitator and the force with which they strike the inner periphery of the cylinder, in consequence whereof each fiber is brought into contact with the binder so frequently and so many times that by the time an individual fiber has reached the exhaust end of the cylinder it has received a very thorough coating of binder. It will be also apparent that due to the whipping action of the agitator, fibers being discharged at the discharge end of the cylinder are delivered in a haphazard, intertwined condition.

Referring now more specifically to Figures 4, 5 and 6, I shall describe next the construction and operation of the feeder 23. This element of the apparatus comprises two vertical parallel side members 77 suitably braced and supported upon standards 78, the side portions or members 77 to the right of the device as viewed in Figures 5 and 6 forming a receiving hopper.

An endless conveyor or belt 79 is disposed horizontally in said hopper adjacent the bottom thereof, and is carried at its ends upon rollers 80 and 81 supported in the side members 77 upon axles or shafts 82 and 83 respectively. The receiving end of the belt 79 is disposed below the discharge end of the cylinder 49 of the coater 22 and adjacent thereto so as to receive the discharged materials therefrom. At the discharge end of the hopper, an elevator conveyor 84 is mounted upon rollers 85 and 86, mounted upon axles or shafts 87 and 88 respectively, supported in the side portions or members 77. The bottom roller 86 is mounted adjacent the discharge end of the belt 79 and slightly therebelow, with the longitudinal axis of the elevator conveyor 84 being disposed in angular relation to the belt 79 extending upwardly and away from the belt 79 at the discharge end of said elevator conveyor. An endless belt or metal slats 89 supported at their ends upon two side chains 90 passes over the rollers 85 and 86 and forms the transport part thereof. Each metal slat 89 in the belt of the elevator conveyor 84 carries on it a wooden slat 89' each provided with vertically extending projections or prongs 91 in the nature of spikes which are adapted to extend upwardly on the upper side of the elevator and are angularly disposed with respect to the planar sides of the elevator in the direction of movement thereof. Due to the increase of the openings between adjacent metal and wooden slats as they pass over the rollers 85 and 86, fine particles of the fibers may be caught between adjacent slats. To prevent clogging of the conveyor 84 under such conditions, a continuous fabric belt 90' is interposed between the metal and wooden slats. Since the projections or prongs 91 do not always pick up a uniform load, a stripper 92 comprising a cylindrical portion 93 suitably secured to a shaft 94 passing axially therethrough and journaled in the side members 77 is mounted adjacent the upper end of the elevator conveyor 84, in proximity to the upper side thereof.

The cylindrical portion 93 of the stripper 92 carries two longitudinally extending diametrically opposed strips 95 and 96 suitably secured thereto, the free edges of the strips being adapted to extend in proximity to the ends of the projections or prongs 91 when the stripper is revolved. The clearance between the free edges of the strips 95 and 96 and the ends of the projections or prongs 91 is, of course, determined by the depth of material which it is desired that the elevator conveyor 84 should carry. The strips 95 and 96 may be of leather or other suitable material, and the adjustment for thickness or quantity of material to be carried by the elevator may be made either by trimming the strips along the free edges thereof or by providing an adjustment of the shaft 94.

Adjacent the discharge end of the elevator conveyor 84, and extending in proximity thereto and thereacross is a wire brush 97 comprising a central cylindrical portion 98 mounted upon a shaft 99 journaled in the side members 77, the cylindrical portion 98 being provided with radially outwardly extending bristles 100 which are adapted to wipe the slats 89 and projections or prongs 91 as the latter pass over the top roller 85, to remove fibers and binder from the slats and the prongs thereby preventing clogging of the conveyor. It will be noted that the peripheral movement of the brush 97 is in the direction of movement of the conveyor and therefore in the direction of the free ends of the projections or prongs 91. It will be apparent that the removal of the coated fibers and binder is thus greatly facilitated and the brush 97 consequently operates at maximum efficiency.

The moving parts of the feeder 23 are operated by motors 101 and 102 suitably mounted upon a standard 103 adjacent the near side of the feeder as viewed in Figure 5. Motor 101 operates the stripper 92 and brush 97, while motor 102 operates the elevator conveyor 84 and conveyor belt 79. Shaft 94 of the stripper 92 extends outwardly beyond the side members 77 at both the near and far side of the mechanism as viewed in Figure 5, the near side end of the shaft being provided with a pulley 104 connected to a pulley on the armature shaft of motor 101 by means of a belt 105. The far end of shaft 94 carries a pulley 106 connected by means of a belt 107 with a pulley 108 on the far side outwardly extending end of shaft 99 of the brush 97. Belt 107 is twisted so as to impart a rotational movement to the brush 97 in the opposite direction from that imparted to the stripper 92 as will be apparent from the direction of operation of each indicated by the arrows in Figure 6. Motor 102 operates a worm and gear reduction means (not shown) housed in a gear box 109 suitably secured to the standard 103, through a countershaft 110 also supported on said standard, and suitable pulleys, and belts 111 and 112. The driven shaft 113 of the above noted worm and gear reduction means has operative connection with a sprocket suitably secured upon the near side outwardly extending end of shaft 87 by means of a chain and sprocket connection 114. Elevator conveyor 84 drives the lower roll 86, and the latter in turn operates the roll 80 by means of a chain and sprocket connection 115, the sprockets (not shown) of which are mounted on the near side outwardly extending ends of shafts 82 and 88.

Chain and sprocket connection 115 includes a speed reducing set of sprockets 116. While I have illustrated the feeder 23 as being operated by independent motors, it will be understood that a single motor may be employed.

In operation, conveyor belt 79 receives the coated fibers discharged by the coater 22 thereupon and conveys them toward the lower end of the elevator conveyor 84 in the direction indicated by the arrow thereabove. The projections or prongs 91 of the elevator conveyor receive these fibers as discharged by the belt 79 by spearing the fibers. Since the prongs or projections 91 do not always pick up a uniform load due to the fact that the fibers are wet and sticky, the stripper 92 functions to slap off the excess material conveyed by said elevator conveyor and throws such material back into the hopper and upon the belt 79. As the slats 89 with their load of coated fibers come up over the top of the discharge end of the elevator conveyor 84 and start downwardly, the rapidly revolving brush 97, the peripheral direction of which is in the same direction as the movement of the under-side of the elevator conveyor, wipes the fibers clear from the projections or prongs 91, thus clearing these prongs and the slats 89 thereby preventing clogging of the elevator conveyor 84. It is to be noted that due to the rapid rotation of the brush 97, the coated fibers fall in a haphazard manner and are accumulated in a loose mass of intertwined fibers upon a moving surface of the combined compressor and setting accelerator 24 as will be described in greater detail hereinafter.

I shall next describe the construction and operation of the combined compressor and setting accelerator 24, the furnaces 25 and operative connections of the latter with the former, and edger 26, reference being had to Figures 1B and 2B and more particularly to Figures 7A and 7B. The combined compressor and setting accelerator 24 is mounted upon a supporting structure comprising a framework 117 having two parallel intermediate members 118 provided with suitable downwardly extending legs 119 and an upwardly extending intermediate frame-work 120 comprising upwardly extending standards 121 connected together at their upper ends by means of horizontal members 122. Frameworks 117 and 120 are both suitably braced by angular and transverse struts. The receiving end of the mechanism, is disposed under the discharge end of the elevator conveyor 84 of the feeder 23 (see Figure 6). The coated fibers discharged by the elevator conveyor 84 are adapted to fall freely in a loose mass upon a horizontally disposed moving reticulated belt 123 passing over a roller 124 mounted transversely between the ends of the intermediate members 118 at the extreme receiving end of the mechanism. At this end of the mechanism, the belt 123 is supported for horizontal movement upon a series of rollers 125 likewise journaled in the intermediate members 118 and extending transversely therebetween. Extending vertically upwardly along the edges of the belt 123 at the receiving end of the mechanism, are guide members 126. These guide members serve to prevent the respective edges of the loose mass of fibers from running or dropping off the edges of the belt 123.

At the discharge end of the mechanism, the belt 123 is supported upon a drum 127 over which it passes and thence back to the roller 124 at the receiving end of the mechanism, the lower portion of said belt returning by a path underneath the mechanism and passing under a roller 128 and over a roller 129 positioned proximately to the roller 128 whereby any kinks which may develop in the belt are smoothed out and which maintain the belt 123 taut as it is carried over roller 124. Rollers 128 and 129 are of felt and are oiled to lubricate belt 123 to prevent the binder from adhering thereto. The belt 123 comprises a reticulated structure of cold drawn steel wire, twisted into spirals and each spiral twisted into the neighboring spiral so as to provide a flexible structure. The ends of the wires and the edges of the belt are bent over and around each other so as to prevent unraveling thereof. This construction permits free passage of pre-heated air and at the same time prevents warping of the belt.

An upper belt 130 is provided for horizontal movement parallel and in spaced relation to the lower belt 123, the belt 130 being adapted to pass over a roller 131 mounted between the intermediate members 118 adjacent the receiving end of the mechanism, at the juncture of the end standards 121 therewith adjacent this end of the mechanism. At the discharge end of the mechansim, the belt 130 passes around and over a drum 132 and under an idler roller 133 and thence upwardly over a roller supported adjacent the discharge end of the mechanism upon the horizontal members 122, thence over additional supporting rollers 135 likewise supported upon the horizontal members 122 in spaced relation, over an end roller 136 likewise supported by the horizontal members 122 at the juncture thereof with the end standard 121 adjacent the receiving end of the mechanism and back over the roller 133.

Rollers 135 are of felt carrying oil for coating belt 130 whereby the binder is prevented from adhering thereto. The idler roller 133 functions to take up the slack in the belt 130. A roller 137 is journaled between the intermediate members 118 in parallel relation to and directly underneath roller 131, the belt 123 being adapted to pass thereover for a purpose to be thereinafter described. Roller 131 and drum 132 are each vertically adjustable to permit of adjustment of the distance between the upper belt 130 and the lower belt 123.

Inasmuch as the edges of the belts 123 and 130 cannot be smooth nor the width constant, guides 138 are positioned between the belts and slightly inwardly of the edges thereof to prevent running over of the material at the edges of the belts and to aid in the retention of rigidity of the material disposed between the belts during the first portion of the movement thereof through the mechanism. Rollers 131 and 137 cooperate to retain the belts 123 and 130 in a definite spaced relation so that as the mass passes through between the belts at this point, it is compressed.

Inasmuch as the cementitious binder employed is not flexible while setting, the material passing through the first portion of the setting period must be held rigid, for the reason that any movement of the fibers relative to one another during the setting process would break up the bond to the extent that the finished product would have little or no strength.

Further, since the belts 123 and 130 are flexible, after compression of the mass between the rollers 131 and 137, there would be a tendency on the part of the mass to again expand thereby spreading the belts apart. To maintain the mass in compressed condition, and at the same time to retain the mass in rigid condition, I have provided two perforated plates, 139 and 140 of special non-buckling alloy steel, which, while allowing for comparatively free passage of air therethrough, nevertheless act to hold the fibrous material firmly in place. Plate 139 is mounted fixedly between the intermediate members 118 and acts to support the belt 123 which passes thereover, while plate 140 is mounted for adjustable vertical movement above the lower portion of the belt 130. Plate 140 is adjustable vertically so as to be positioned for any desired thickness of the material passing underneath it. Between the discharge ends of the plates 139 and 140 and the discharge end of the mechanism, belt 123 is supported upon a series of transversely disposed rollers 141 to support the belt for movement in a horizontal plane to the discharge end of the mechanism.

In order to accelerate the setting of the binder, the mechanism 24 has been provided with circulation system whereby preheated gases or air is passed through the belts 123 and 130, and plates 139 and 140. The air is preheated in furnaces 25 which have hot air outlet pipes 142 and 143 extending from the tops thereof. Outlet pipe 142 is connected with an inverted U-shaped inlet pipe 144 positioned substantially centrally of the mechanism directly underneath the transverse members connecting the horizontal members 122, the juncture of these pipes being indicated at 145.

The left hand end of the inlet pipe 144 as viewed in Figure 7B is connected to a downwardly flared vent 146 which is adapted to direct pre-heated air down through the belts 123 and 130 and through the material passing between said belts. The right hand end of the inlet pipe 144 as viewed in Figure 7A is likewise connected to a downwardly flared vent 147 directing a blast of pre-heated gas or air through the plate 140, belts 123 and 130, and lower plate 140 and also passing through material being carried by the belt 123.

After passing through the belts and material carried thereby, the gas or air is returned to the furnaces 25 by a return connection pipe 148 (see Figure 1B) of U-shaped formation having the legs thereof connected to upwardly flared vents 149 and 150, respectively positioned below the vents 146 and 147, the connections being indicated at 151 and 152 respectively. The intermediate portion of the return pipe 148 is connected by means of a return pipe 153 with a horizontally disposed inlet pipe 154 connected with inlet ports of fan housings 155 and 156, (see Figure 1B). These fan housings contain fans which are driven by belt conections 157 and 158 respectively from motors 159 and 160 respectively. The exhaust ports of the fan housings 155 and 156 are connected to the intake ports of the furnaces 25.

Pipe 143 conveying pre-heated air from the right-hand furnace as viewed in Figure 1B is connected with a U-shaped inlet pipe 161 as indicated at 162 in Figure 7A. The left-hand end of this inlet pipe 161 as viewed in this figure is connected to an upwardly flared vent 163 disposed underneath belt 123 and between the exhaust vents 149 and 150.

The downwardly flared outlet vent 164 disposed in opposed relation to the inlet vent 163 has connection with a return pipe (not shown) at 165, this return pipe having connection with pipe 154 for returning the air to the furnaces 25. The right hand end of the inlet pipe 161 as viewed in Figure 7A has connection with an upwardly flared inlet vent 166 which is adapted to direct the preheated air through the lower plate 139, lower belt 123, the material supported thereby, upper belt 130, and upper plate 140, thence into a downwardly flared outlet vent 167 the upper narrow end of which is connected with an exhaust pipe 168 provided at its end with an exhaust fan 168' which aids the passage of the gas or air through the moving, sticky mass being carried through the first pass and which is adapted to exhaust the gas or air passing therethrough into the open atmosphere. Such gas or air as is being exhausted by the exhaust pipe 168 is replaced by fresh gas or air being taken in at the discharge end of the mechanism through an opening in the vent 149. It is to be noted that only originally pre-heated gas or air is being exhausted through the vent 166, outlet vent 167 and exhaust pipe 168 so that the gas or air passing through these conduits is at the maximum pre-heated temperature. Gas or air passing through the intermediate vents is not quite up to the maximum pre-heated temperature, but is close enough thereto so that the difference in temperature is practically negligible. Gas or air being taken in at the extreme left end of the vent 149 however is cold or at ordinary atmospheric temperature so that a comparatively cool blast of gas or air passes through the belts 130 and 123 adjacent the discharge end of the mechanism.

To prevent the passage of gas or air from one pass into the adjacent one and to direct such gas or air through the moving mass, a series of baffles are provided between adjacent passes. Since the lower conveyor 123 is suported for movement in a horizontal plane, the baffles 141' provided between the lower portions of adjacent passes are fixed. The upper conveyor 130 is, however, vertically adjustable, and the baffles provided between the upper portions of adjacent passes are movable. Due to the fact that the upper plate 140 may be moved vertically and extends through two adjacent passes, baffles 142' provided between the first and second, and second and third passes (from the receiving end of the mechanism) are adjustable vertically to accommodate such adjustment of plate 140 as may be desired. Baffles 142' are merely suitably suported for free sliding movement, their lower ends resting freely upon the upper face of plate 140 and obtain vertical movement from movement of this plate. Conveyor 130, after passing beyond the end of plate 140, merely rests freely upon the rigid moving sheet of material, so that its movement must be accommodated for various vertical adjusted positions. Thus baffles 143' disposed between the upper portions of the third and fourth, and fourth and fifth passes (from the receiving end of the mechanism) are suitably pivoted for swinging movement in the direction of movement of conveyor 130. Thus baffles 141', 142' and 143' positively compel the passage of gas or air through the moving mass in all passes.

Since side guide plates 138 are disposed inwardly of the edges of conveyors 130 and 140, it will be apparent that the mass being compressed between rollers 131 and 137 must be retained against lateral displacement until the side guide plates 138 take up this function. To this end, I have provided interchangeable guide plates 126' (see Figures 7A and 7C). Each comprises a body portion 127' having two parallel edges having one end perpendicular to the edges and extending from one to the other of the edges. The other end is in the nature of an extension 128' defined by the straight lower edge and a curved upper edge 129' extending downwardly from the upper straight edge with the lower portion of the curve ending in a line parallel with the lower edge. This curved edge 129' is of a configuration to fit the curvature of the upper conveyor 130 as it passes over the roller 131. The upper edge of plate 126' is formed with an outwardly extending channel portion 130' for purposes of reinforcing such edge, and the lower edge is provided with a reinforcing portion 131'. Extension 128' is provided on its outer side with a rectangular block 132'. Along the end opposite extension 128', a plurality of spaced perforations 133' are provided for receiving suitable securing means for fastening plate 126' to the adjacent end of guide plate 126. Block 132' serves as a means for adjusting the elevation of roller 131, thereby determining the resultant desired thickness of the moving mass. For the varigated desired thicknesses, the vertical transverse dimensions of the blocks of the various interchangeable plates vary, the horizontal dimensions remaining unchanged.

Thus as the coated fibers are carried into the mechanism originally in the form of a loose mass by the lower belt 123, as the mass passes through the space between the rollers 131 and 137 it is compressed thereby, the edges of the mass being meanwhile retained in the space between the belts by the side guides 126 and 138. During the first portion of movement through the mechanism the mass is held in compressed condition by the plates 139 and 140, a comparatively hot blast of air being at the same time passed therethrough to accelerate the setting of the binder. As the continually moving mass passes beyond the discharge ends of the perforated plates 139 and 140, it has taken on sufficient rigidity to support itself, so that the mass is then carried entirely by the lower belt 123 riding over the rollers 141. At this time the mass has assumed the form of a continuous sheet of fibrous material. As the sheet continues on to the discharge end of the mechanism, it passes through the colder blast of air being taken in by the left hand end of the vent 149 so that whatever heat the sheet of material may retain is drawn off, thereby cooling the sheet. The flow of the air through the circulation system has been indicated by arrows.

Referring particularly to Figure 7B, as the sheet of material passes beyond the ends of the belts it is supported upon a series of rollers 169. As an extra precaution for centering of the sheet as it is discharged by the combined compressor and setting accelerator 24, to the edger 25, a side guide 170 is provided at each side edge of the edger.

The combined compressor and setting accelerator 24 is driven from a motor 171 driving a pulley 172 through a speed reduction pulley 173 (see Figures 2B and 9), shaft 174 upon which pulley 172 is mounted having at its outer near end as viewed in Figures 1B and 2B a sprocket pinion 175 connected to a sprocket 176 by means of a chain 177. Shaft 178 which carries the sprocket 176 extends through the frame of the mechanism and beyond the far side of the mechanism and carries at this end a pinion 179 meshing with a gear 180 carried by the shaft 181 of the drum 127 carrying the discharge end of the lower belt 123. Gear 180 meshes with a gear 182 carried on the far end of shaft 183 upon which the drum 132 carrying the discharge end of the upper belt 130 is fixed. The near end of shaft 183 carries a sprocket 184 which is connected by a chain 185 with a sprocket 186 carried by the near end of shaft 187 supporting the roller 131. By imparting motion to the roller 131 by means of the sprocket and chain connection with sprocket 184, any drag on the belt 130 which might ordinarily result if roller 131 were nearly idling, is eliminated, thus insuring of uniform movement of the belt at the point where the loose mass is being compressed.

In practice, it has been found that a uniform movement of the belt 123 at a rate of from 2 to 6 feet per minute gives very satisfactory results.

As the sheet of material is discharged from between the drums 126 and 132, it is adapted to ride over the series of rollers 169 provided upon an extension supporting table 189 upon which the edger and cutter mechanisms are carried.

An edger wheel 190 of abrasive material is supported at each side edge of the table 189 by the armature shaft of the motor 191 in turn supported upon an inverted U-shaped supporting member 192 extending laterally from the side edges of the table 189 and being suitably braced and secured thereto. The motors 191 are adjustable transversely of the table top so as to permit of accommodation of the edger wheels 190 to desired widths of the sheet material. Three-quarter H. P., three phase motors, rotating at 3,600 R. P. M. have been found to be well suited for this portion of the apparatus. As above stated, on delivery from the compressor and cutting accelerator 24, the sheet of material is first guided between two side guides 170 as an added precaution for centering of the sheet for passing between the two edger wheels 190.

Coming now to the final step in the continuous process, reference being had particularly to Figures 2B and 9, the continuous moving sheet of material is cut into slabs by a cutter 27 mounted substantially midway of the table 189 and supported for movement both transversely and longitudinally of the table top. A rotary saw 193 is mounted upon the armature shaft of a motor 194 suspended from two parallel transversely extending rods 195 by a carrier 196 mounted for sliding movement along said rods. The ends of the rods are supported in two side plates 197 in turn secured at their ends to vertical members 198 connected together at their lower ends by horizontal members 199 carrying peripherally grooved rollers 200 which ride upon tubular tracks 201 suitably supported in brackets 202 secured to the outer sides of the table 189.

At their intermediate portions the horizontal members 199 carry depending arms 203 supporting peripherally grooved guide rollers 204 engaging the under sides of the tubular tracks 201. The upper ends of the vertical members 198 are connected together by transversely extending angle iron members 205 so that the rotary saw support is in the nature of a traveling crane. The left-hand vertical members 198 as viewed in Figures 2B and 9, each support a pivoted arm 206, the outer ends of which are connected together by a transverse member 207. At its intermediate portion, the member 207 has secured thereto a downwardly extending U-shaped abutment member 208, the purpose of which will be hereinafter described. A rail 209 is supported upon the table-top above a series of spaced sheet supporting rollers 210 each of these rails being disposed slightly inwardly from the sides of the table 189. The connecting member 207 which is longer than the width of the table, is adapted to ride upon the rails 209 with the abutment member 208 just clearing the upper portions of the peripheries of the rollers 210. Adjacent the left-hand end of each rail 209, each is provided with an upwardly bowed track member 211.

The rails 209 are arranged so as to guide the moving sheet of material therebetween so that the slab which is being cut off by the saw is maintained in motion in a line normal to the transverse movement of the saw. Inasmuch as the saw carrier crane is substantially wider than the table 189, the saw 193 may be moved beyond the edges of the moving sheet of material.

Assuming that the saw carrier is positioned at the near end of the supporting crane as viewed in Figure 2B, with the carrier frame or crane moved to the right, the edge of the moving sheet of material is given free passage between the vertical members 198 of the saw-supporting frame until it abuts the abutment member 208. At this time as the moving sheet of material advances, the saw support is moved to the left upon the tubular track members 201 due to the pressure exerted against the abutment member 208 by the edge of the sheet by the advancing movement of the sheet of material. The rotating saw may then be moved transversely of the moving sheet of material along the rods 195. It will be evident that due to the advancing movement of the saw-carrier frame as the saw is moved transversely of the moving sheet of material, the cut will be normal to the axis of the moving sheet. Since the sheet of material advances only at the rate of from 2 to 6 feet per minute and the cutting operation takes but a few seconds, the slab will have been cut off by the time the member 207 reaches the bowed tracks 211. As the left-hand edge of the slab carries the abutment member 208 with it, when the member 207 is carried up on the bowed track 211, the abutment member 208 becomes disengaged from the edge of the sheet so that the saw-carrier frame then becomes stationary. The saw-carrier frame may then be moved to the right for positioning preparatory to cutting of the next slab. It will be noted that the lowermost portion of the abutment member 208 is well rounded so as to prevent marring or cutting of the surface of the slab already finished as the saw carrier is moved to the right.

While in the instant case the saw mechanism has been illustrated as being manually operable, a hand-hold 212 (see Figure 9) having been provided upon the motor housing for this purpose, it will be evident that the operation of this portion of the mechanism may be made automatic so as to eliminate the manual operation of the last step of the process.

In Figure 10, I have illustrated a fragmentary perspective view of one end of a finished slab.

Referring now to Figure 11 in which I have illustrated a section through a modified form of compressor and setting accelerator, the section corresponding to that shown in Figure 7A. All parts and details of this modified construction similar in character to the mechanism illustrated in Figures 7A and 7B are indicated by the same reference numerals and for a more detailed description of their nomenclature and function reference may be had to the foregoing detailed description.

The modification in this case resides mainly in the provision of novel conveyors 300 and 310, the former constituting the lower conveyor and the latter, the upper. Lower conveyor 300 comprises an endless belt of transversely extending slats or plates 301 provided with suitable perforations 302 therein. As in the modification disclosed in Figures 7A and 7B, the conveyor 300 is supported at the receiving and discharge ends of the mechanism on suitable rollers, the upper portion extending longitudinally through the mechanism and the lower or return portion extending below the mechanism. Slats or plates 301 are preferably connected together at their ends by endless chains (not shown) or they may be connected together in any other suitable or desired manner. To maintain the conveyor 300 in a single plane during its passage through the mechanism from the receiving to the discharge end thereof, a track 302 is provided at either side of the mechanism and is supported upon the inner face of each intermediate member 118. Track 302 may be suitably secured to member 118 by means of bolts 303. Inasmuch as conveyor 300 is adapted to carry binder coated fibers which are received thereon in "wet" condition, a felt roller 304, containing oil or any other suitable lubricant, is mounted adjacent the lower end of leg 119 to contact the supporting faces of plates 301 and distribute a thin film of lubricant thereon to prevent the binder coated fibers from adhering to the plates during their passage through the hot gas or air passes. Upper conveyor 310 may be supported at the discharge end of the mechanism in the same manner as the upper belt 130 of the modification disclosed in Figures 7A and 7B and is adapted to have its return portion carried back to the receiving end of the mechanism over rollers 135 and 136. Conveyor 310 likewise comprises an endless belt of transversely disposed slats or plates 305 supported and connected together at their ends by suitable endless chains (not shown) and having perforations 306 therein. To prevent the occurrence of large spaces between adjacent plates 305 as the conveyor 310 approaches the mass carried upon conveyor 300 at the receiving end of the mechanism, an abrupt turn or direction change occurs over a roller 307 at a point to the rear and above the end frame member 121, whereby the approach of the conveyor 310 for entry into the mechanism is gradual. To maintain the upper conveyor 310 in definite spaced relationship to the lower conveyor 300 and to thereby afford the upper conveyor a suitable backing for applying pressure upon the moving mass, the gradually declining portion of the conveyor is adapted to ride under a downwardly inclined track 308 at each side thereof. The maintenance of pressure upon the mass during its first portion of passage through the mechanism is accomplished by the passage of the conveyor 310 under a track 309 at each side of the mechanism. Track 309 need only extend into the mechanism for substantially two passes for by the time the mass has passed through the first two passes of gas or air, the mass will have taken on sufficient rigidity to support itself so that no further pressure need be applied to it. As in the previous modification, suitable interchangeable side guide plates 138 are provided at each side of the mechanism to prevent the running out of the material at the edges of the moving mass during the compression stage. The plates 138 extend inwardly from the edges of the conveyors 300 and 310. At the receiving end of the mechanism, interchangeable side guide plates 311 having blocks 312 corresponding to interchangeable guide plate 126' are employed. A lubricating felt roller 313 is suitably supported adjacent and in opposed relation to roller 307 to lubricate the faces of plates 305 to prevent adhesion of the binder coated fibers thereto in the course of passage of the mass through the hot passes of gas or air. A series of swinging baffles 314 which may be suitably spring projected upwardly and which extend in the direction of movement of lower conveyor 300, are interposed between adjacent lower portions of the gas or air passes to compel the gas or air to flow through the perforations 302 of lower conveyor 300 and the moving mass. A similar set of swinging baffles 315 are provided between the upper portions of adjacent passes.

While the perforations in the plates and the interstitial spaces between adjacent plates may permit the formation of surface protuberances, they will be relatively small and of no detrimental consequence due to the length of the fibers employed and the promiscuous arrangement thereof in the mass. The resultant slabs may be smoothed by the employment of suitable abrasives if smooth surfaced slabs are desired, or the faces of the slabs may be left unfinished.

In the latter case, the surface irregularities will permit of better bonding to the slabs of finishing substances such as plaster, stucco, or the like.

While the conveyors 300 and 310 have been described as being supported at their sides upon endless chains, it will be readily apparent that the plates thereof may be assembled into continuous belts in any other manner in accordance with the present practice in the manufacture of well known "caterpillar" treads which might be suitable for the purpose.

It will thus be seen that I have provided a novel apparatus for the manufacture of heat and sound insulating slabs of building material whereby said slabs may be manufactured by continuous process.

While I have disclosed a preferred arrangement or sequence of the steps of the process employed in the manufacture of the slabs by continuous process, and have disclosed a preferred arrangement of the apparatus for carrying out the various steps of the process together with certain novel structure and arrangement of various portions of the apparatus, I do not wish to be limited thereto. As will be understood by those skilled in the art, changes may be made therein without departing from the essence of the invention or the spirit and scope of the appended claims.

What I claim and desire to secure by Letters Patent is:

1. In an apparatus of the class described, a compressor and setting accelerator for a loose mass of binder coated fibres comprising a conveyor for receiving a continuous deposit of said fibres, a cooperating conveyor disposed above said first conveyor, means for directing blasts of pre-heated air through said mass for accelerating setting of said mass, and means for maintaining said mass under compression during a portion of the setting of said mass, said means comprising plates provided with perforations for the free passage of said air therethrough.

2. In an apparatus of the class described, a compressor and setting accelerator for a loose mass of binder coated fibres comprising a conveyor for receiving a continuous deposit of said fibres, a cooperating conveyor disposed above said first conveyor, said conveyors comprising endless belts of reticulated construction, means for directing blasts of pre-heated air through the mass for accelerating setting of said mass, and means comprising perforated plates for maintaining said mass under compression whereby said air may freely pass through said plates and conveyors to accelerate setting of said mass, whereby said mass will assume the form of a continuous sheet.

3. In an apparatus of the class described, a compressor and setting accelerator for a loose mass of binder coated fibres comprising a conveyor for receiving a continuous deposit of said fibres, a cooperating conveyor disposed above said first conveyor, means cooperating with said conveyors for maintaining said mass under compression comprising backing plates for said conveyors and means for further maintaining said mass under compression comprising fixed guides extending along the edges of said conveyors.

4. In an apparatus of the class described, a compressor and setting accelerator for forming insulating material comprising a continuous belt of moving plates adapted to receive binder coated fibers, and a second belt of moving plates adapted to cooperate with said first belt for maintaining said fibers in rigid condition relative to one another while the fibers are moving, said moving plates having perforations therein and means for circulating gases therethrough and through the fibers maintained in rigid condition.

5. In a process of forming heat and sound insulating material of binder coated fibers, a method of accelerating the setting of the binder of a moving mass of said fibers which comprises maintaining the fibers of said mass rigid to one another between perforated plates, and passing gases through the plates and the mass while the mass is in motion.

6. In an apparatus for forming insulating material from fibres coated with a cementitious material, a pair of perforated belts spaced apart, means for moving said belts at uniform speed, a perforated plate disposed below the lower one of said belts, a perforated plate disposed above the upper one of said belts, means for depositing a loose mass of coated fibres on the lower one of said belts, said mass being thicker than the distance between said belts and being compressed by the belts, and means for directly forcing warmed air through said plates, belts and fibres to set the cementitious material, said plates holding the moving mass of fibres rigid during the setting of said cementitious material.

7. A method of forming a continuous sheet of insulating material which comprises subjecting a moving mass of cementitious binder coated vegetable fibers to pressure so that said fibers are maintained in relatively immovable relationship and subjecting said moving mass to the passage of preheated gases therethrough to set said moving mass and they releasing successive portions of aid moving mass and subjecting said released portions to the passage of preheated gases therethrough.

HERBERT LIBBERTON.